(12) United States Patent
Harriman et al.

(10) Patent No.: US 9,026,698 B2
(45) Date of Patent: May 5, 2015

(54) APPARATUS, SYSTEM AND METHOD FOR PROVIDING ACCESS TO A DEVICE FUNCTION

(71) Applicants: David J. Harriman, Portland, OR (US);
Annie Foong, Aloha, OR (US);
Debendra Das Sharma, Saratoga, CA (US)

(72) Inventors: David J. Harriman, Portland, OR (US);
Annie Foong, Aloha, OR (US);
Debendra Das Sharma, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 13/844,323

(22) Filed: Mar. 15, 2013

(65) Prior Publication Data
US 2014/0281062 A1    Sep. 18, 2014

(51) Int. Cl.
*G06F 3/00*     (2006.01)
*G06F 13/00*    (2006.01)
*G06F 13/42*    (2006.01)
*G06F 3/06*     (2006.01)
*H04L 29/06*    (2006.01)
*G06F 13/38*    (2006.01)
*G06F 9/44*     (2006.01)

(52) U.S. Cl.
CPC ............. *G06F 13/423* (2013.01); *G06F 3/067* (2013.01); *H04L 63/08* (2013.01); *G06F 13/385* (2013.01); *G06F 9/44* (2013.01); *G06F 9/4411* (2013.01)

(58) Field of Classification Search
CPC ........ G06F 13/385; G06F 3/067; H04L 63/08
See application file for complete search history.

(56) References Cited

U.S. PATENT DOCUMENTS

| | | | | |
|---|---|---|---|---|
| 6,128,669 | A * | 10/2000 | Moriarty et al. | 710/1 |
| 2009/0276551 | A1 | 11/2009 | Brown et al. | |
| 2012/0159481 | A1 | 6/2012 | Anderson et al. | |
| 2012/0167085 | A1 | 6/2012 | Subramaniyan et al. | |
| 2012/0215941 | A1 | 8/2012 | Brownlow et al. | |

FOREIGN PATENT DOCUMENTS

WO    WO-20091207798    10/2009

OTHER PUBLICATIONS

"EPO, Extended Search Report for European Patent Application No. 14158781.6", (Apr. 24, 2014), Whole Document.

* cited by examiner

*Primary Examiner* — Zachary K Huson
(74) *Attorney, Agent, or Firm* — Blakely, Sokoloff, Taylor & Zafman LLP (57) ABSTRACT

Techniques and mechanisms for providing access to a function with an input/output (I/O) device. In an embodiment, a main memory of a computer system including the I/O device stores a function-context data structure associating a function with a context for an access to the function. The I/O device stores a configuration for the I/O device to provide the function. In another embodiment, the software process exchanges information with the function-context data structure for the access to the function. The I/O device performs a synchronization of the function-context data structure and the configuration data structure with respect to one another, wherein the function-context data structure operates as a register level interface which interfaces the I/O device and the software process with one another.

27 Claims, 6 Drawing Sheets

APPARATUS, SYSTEM AND METHOD FOR PROVIDING ACCESS TO A DEVICE FUNCTION

BACKGROUND

1. Technical Field

Embodiments discussed herein pertain to the field of computer systems. More particularly, certain embodiments pertain to the field of high speed point-to-point interconnections and communications architectures.

2. Background Art

Computer systems include a number of components and elements. Often the components are coupled via a bus or interconnect. Peripheral Component Interconnect (PCI) is a second generation parallel bus architecture developed in 1992 as a replacement for the Industry Standard Architecture (ISA) bus. In PCI, all the devices share the same bidirectional, 32-bit (or 64-bit), parallel signal path. The PCI bus brought a number of advantages over the ISA bus, including plug-and-play operation. PCI Express (PCIe) is a third generation general-purpose serial input/output (IO) interconnect designed to replace the PCI bus. Rather than being a bus, PCIe is structured around point-to-point serial links called lanes.

In PCI/PCIe architectures, software maintains Bus/Device/Function (BDF) data structures which closely parallel the physical structure of system hardware. Plug-and-play mechanisms of PCI and PCIe support runtime insertion or removal of hardware components (and thus their functionality). However, such mechanisms are often sub-optimal with respect to operation of I/O hardware which is unlikely to be added or removed during runtime operation of a platform. This type of I/O hardware is increasingly common as manufacturing technology continues to trend toward integration, where hardware functionality which is permanently attached to, or even integrated into, the semiconductor die for a central processing unit (CPU) or other critical platform logic.

The conventional Device/Function model of PCI/PCIe for device discovery and configuration has limitations with respect to providing flexibility in mapping hardware resources to software activities. An additional problem with the PCI Device/Function model is that device discovery and configuration techniques and mechanisms are inefficient, slowing resume times from a Sleep state or other such low power states.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously provide mechanisms or techniques for associating a function with one or more contexts which are to allow, qualify or otherwise characterize access to the function by a software process. Such an association of a function with one or more contexts is variously referred to herein as a "function-context" or "FuncText".

In an embodiment, an instance of a function and context being associated with one another (referred to herein as "function-context instance") may include an instance of information being created, communicated or otherwise determined to define that the function and the context are associated with one another. For example, a function-context instance may be or include a registration or other storing of data in main memory to identify that the function and the context are associated with one another. Based on the defined association, one or more mechanisms may operate to allow utilization of the function (and/or qualify utilization of the function) according to the associated context. The function may be differently accessible by some alternate mechanism(s) which are independent of, but concurrent with, the FuncText (FT) instance.

In an embodiment, a FuncText data structure—e.g. maintained in DRAM or other main memory by the host—stores data which describes actual device state and/or desired device state for performance of a function. Such device state information may be variously transferred to and/or from the FuncText data structure by a device which is implement the device state and/or by a software process which is to access the function as provided by that device. Such exchanges may provide for a FuncText data structure to operate as a register level interface, in main memory, for interfacing the device and the software process with one another. In an embodiment, the interface is independent of some or all other software processes of the host OS (e.g. including any virtual machine monitor, guest OS and/or the like).

Figure 1:
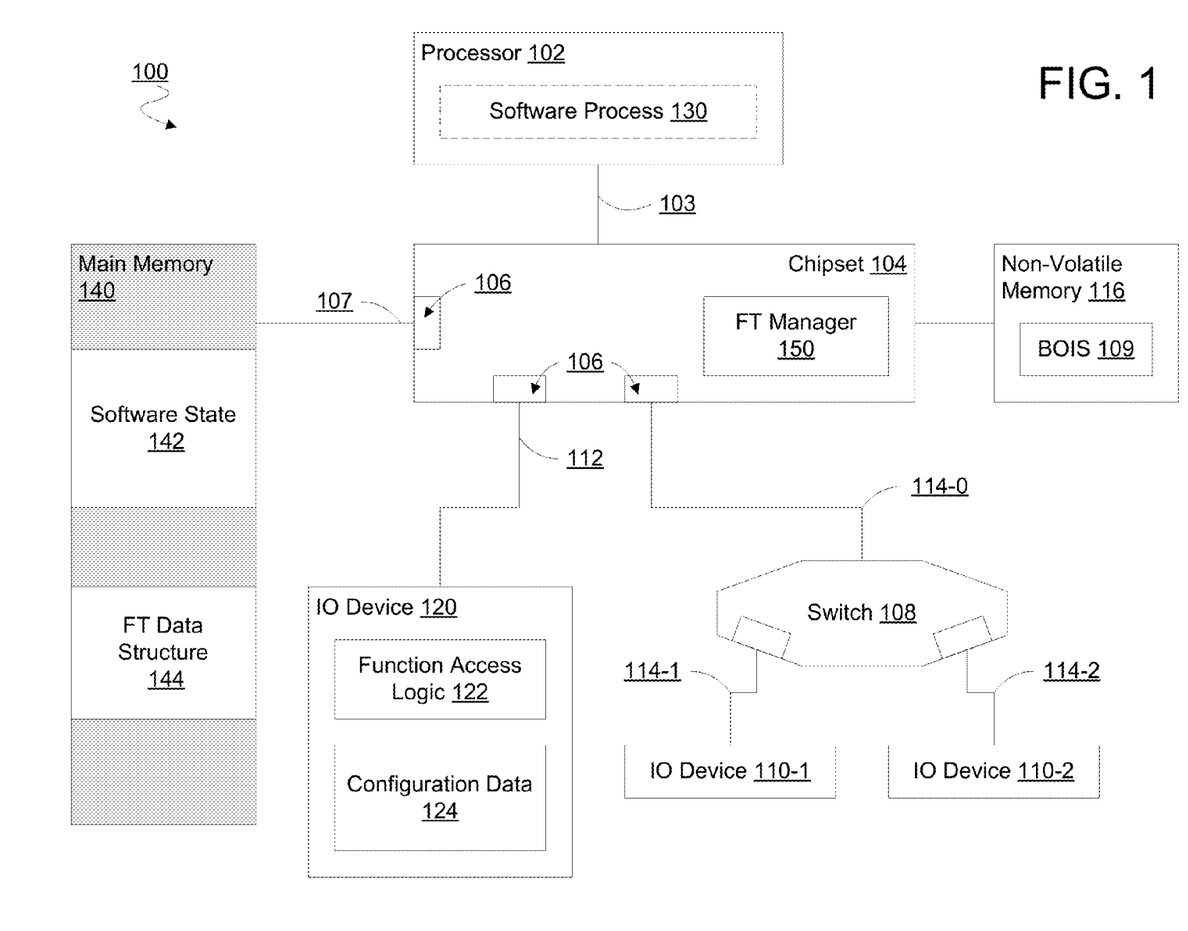
FIG. 1 is a block diagram illustrating elements of a system for providing access to an input/output function according to an embodiment.

FIG. 1 illustrates elements of a computer system 100 including FuncText features for providing function access according to one embodiment. Computer system 100 may comprise a processor system bus (front side bus (FSB)) 103 for communicating information between processor 102—e.g. including a CPU or other host processor—and chipset 104. Processor 102 may include a single core processor or multi-core chip multiprocessor (CMP) to operate as a host processor of system 100. In one embodiment, some or all of chipset 104 may be integrated within processor 102 to provide a system on chip.

Chipset 104 may comprise circuit logic to exchange communications between processor 102 and one or more I/O devices of system 100—e.g. where such circuit logic is to operate as a root complex according to PCI and/or PCIe communication specifications. For example, chipset 104 may include one or more hub devices (not shown)—e.g. including a memory controller hub, an I/O controller hub and/or the like—variously coupled directly or indirectly via respective interconnects to such one or more I/O devices.

By way of illustration and not limitation, chipset 104 may be coupled to main memory 140 via point-to-point interconnect 107 and to an I/O device 120 via point-to-point interconnect 112. In one embodiment, main memory 140 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data. I/O device 120 may include any of a variety of devices for exchanging data including, but not limited to, an audio controller, video controller, network interface card, storage controller and/or the like. Computer system 100 may further include non-volatile (e.g., Flash) memory 116 to operate as a "firmware hub" or FWH, which may include a basic input/output system (BIOS) 109 to perform initialization of computer system 100.

In an alternate embodiment, I/O device 120 may be coupled to chipset 104 via one or more bridges, switches or other intermediary devices. Certain embodiments are not limited with respect to a particular number or arrangement of point-to-point links interconnecting I/O device 120 with chipset 104. Additionally or alternatively, chipset 104 may couple to any of a variety of one or more other I/O devices, according to different embodiments. By way of illustration and not limitation, system 100 may further include I/O devices 110-1, 110-2 coupled to link 114-0 via switch 108 and links 114-1 and 114-2, respectively. In turn, link 114-0 may couple switch 108 to an input/output port 106 of chipset 104.

In one embodiment, interconnects 107, 112 support a point-to-point link protocol including, but not limited to, common system Interface (CSI), peripheral component interconnect (PCI) Express (PCIe) or other like point-to-point interconnect. Accordingly, in one embodiment, one or both of interconnects 107, 112 may provide a point-to-point link, such as defined by PCI Express Base Specification Revision 1.1 to allow bi-directional communication between chipset 104 and one or both of I/O device 120 and main memory 140. In one embodiment, chipset 104 may include peripheral component interconnect PCIe root ports—e.g. including some or all of input/output ports 106—to couple links 107, 112 to link controllers (not shown) of chipset 104. Although one or more of the embodiments described herein may be provided with reference to PCIe, those skilled in the art should recognize that the embodiments described herein are not limited to point-to-point link which support PCIe, and are therefore applicable to other like point-to-point link protocols.

In conventional PCI and PCIe architectures, I/O devices are generally limited to a one-to-one mapping between a PCI function and an OS driver instance. The Functext concept provides generalization from this one-to-one relationship, e.g. where a FuncText instance may be used to variously correspond a specific software process to one specific hardware resource, to a pool of hardware resources of multiple I/O devices, and/or to a subset of hardware resources of a single I/O device.

In an illustrative scenario according to one embodiment, processor 102 may execute a software process 130 which is to access a function—e.g. where software process 130 is to exchange communications with some I/O hardware which is to perform the function. Software process 130 may include a driver for such I/O hardware, although certain embodiments are not limited in this regard. In an embodiment, execution of software process 130 includes main memory 140 maintaining a state of software process 130—e.g. as software state 142. Main memory 140 may further store a FuncText data structure 144 which, in combination with one or more FuncText hardware mechanisms, facilitate such function access by software process 130. For example, FuncText data structure 144 may store data describing an actual state and/or a desired state of I/O device 120 for software process 130 to access the function.

By way of illustration and not limitation, I/O device 120 may include configuration data 124 to store a configuration for performance of a particular function by I/O device 120. Other logic (not shown) of I/O device 120 may perform the function according to the configuration defined in configuration data 124, e.g. in response to I/O device 120 receiving via 104 a request for the function.

For example, system 100 may include—e.g. in chipset 104—a FuncText (FT) manager 150 to prepare for use of FT data structure 144 as a register level interface between a device which is to provide a function and a software process which is to access the function. Such preparation may be in response to FT manager 150 identifying a capability of I/O device 120 to support FuncText functionality according to an embodiment.

In an embodiment, FT manager 150 creates FT data structure 144 in a physical location in main memory 140 and/or perform operations to variously add, delete or otherwise modify data in FT data structure 144 in runtime. In an embodiment, FT manager 150 may be modified to include a reference to I/O device 120 and/or a reference to software process 130. Alternatively or in addition, FT manager 150 may directly or indirectly communicate to I/O device 120 and/or software process 130 some reference (e.g. a base address, pointer, handle and/or the like) to FT data structure 144 for use in reading from and/or writing to FT data structure 144.

Access to a function of I/O device 120 by software process 130 may include I/O device 120 and software process 130 communicating via FT data structure 144 as a register level interface in main memory 140. For example, software process 130 may execute one or more instructions specifying an exchange of data with FT data structure 144, and function access logic 122 of I/O device 120 may variously synchronize configuration data 124 with FT data structure 144. For example, software process 130 may write different types of data to different locations in FT data structure 144, where I/O device 120 may variously synchronize such different locations in FT data structure 144 each with a different corresponding location in configuration data 124.

Figure 2:
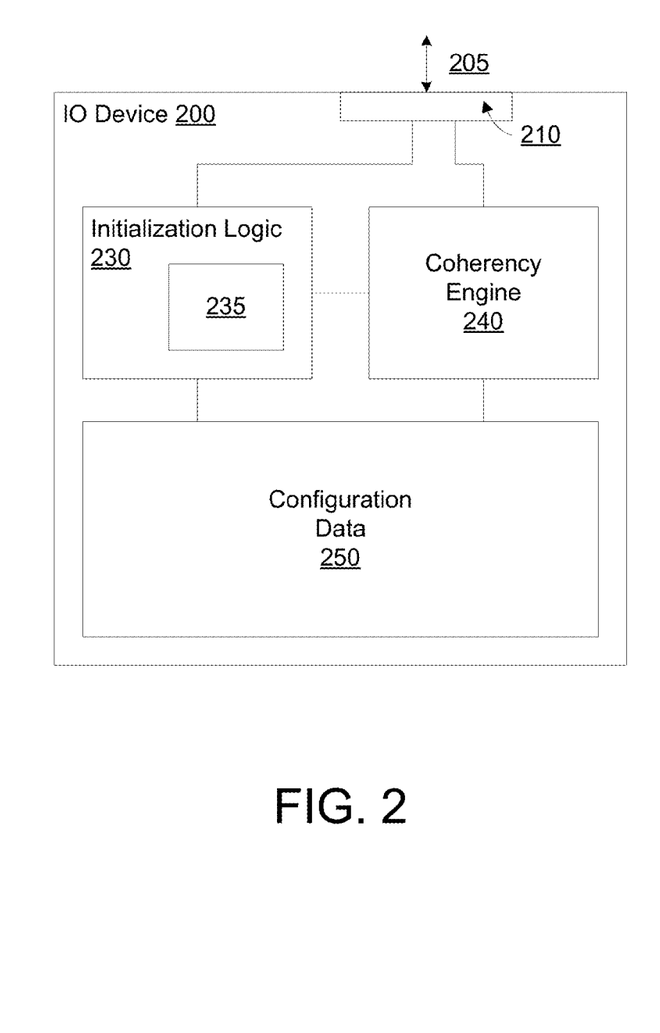
FIG. 2 is a block diagram illustrating elements of a device to provide a function for access by a software process according to an embodiment.

FIG. 2 illustrates elements of an input/output (IO) device 200 for providing access to a function according to an embodiment. I/O device 200 may include mechanisms to support one or more FuncText mechanisms of computer system 100, for example. In an embodiment, I/O device 200 includes some or all of the features of I/O device 120.

I/O device 200 may include circuitry for operating in a computer platform—e.g. including an interface 210 for coupling I/O device 200 with a chipset of the computer platform via one or more point-to-point interconnects. I/O device 200 may exchange via interface 210 communications 205 compatible with a communication standard such as PCI or PCIe.

I/O device 200 may further include hardware (not shown) capable of performing one or more functions—e.g. for a software process in direct or indirect communication with I/O device 200 via interface 210. By way of illustration and not limitation, I/O device 200 may support any of a variety of functions which may be identified according to existing PCI Bus, Device, Function discovery conventions. Certain embodiments are not limited with respect to the particular type of I/O function to be associated with context by a FuncText instance.

In an embodiment, I/O device 200 further includes FuncText mechanisms—e.g. including data, control circuitry, communication circuitry and/or the like—to provide access (and/or to qualify access) to at least one such function. By way of illustration and not limitation, I/O device 200 may include initialization logic 230 to perform one or more operations during a boot-up sequence of the computer platform. In an embodiment, initialization logic 230 includes or couples to a repository 235 of I/O device 200 (e.g. one or more registers of non-volatile memory) which stores data which has been pre-programmed—e.g. by a manufacturer of I/O device 200—for use in identifying capabilities of I/O device 200.

Based on such pre-programmed data, initialization logic 230 may send in communications 205 information to identify a device-type of I/O device 200, a function which I/O device 200 is capable of performing and/or one or more FuncText mechanisms of I/O device 200 for providing access to the function. Some or all such information from initialization logic 230 may, for example, be directly or indirectly communicated to a BIOS process or other device/function discovery mechanism of the computer platform during boot-up.

Additionally or alternatively, initialization logic 230 may receive via communication 205 a reference (e.g. an address, pointer, handle, etc.) to a FuncText data structure for a FuncText instance which associates the function with one or more contexts. As discussed herein, such a reference may be provided by specialized circuit logic for managing FuncText functionality on the host side—e.g. where such circuit logic operates in a chipset of the computer platform. I/O device 200 may subsequently use the reference for exchanging information with such a FuncText data structure in support of providing software with access to the function. In another embodiment, I/O device 200 may receive such a FuncText data structure reference (or an alternative reference) during runtime operation of the platform.

In an embodiment, I/O device 200 includes additional memory to store in one or more data structures—represented by the illustrative configuration data 250—a configuration for I/O device 200 to provide access to a function. Configuration data 250 may include, for example, data provided via the platform chipset (e.g. from the OS), data retrieved by I/O device 200 from main memory and/or data copied from repository 235. Alternatively or in addition, configuration data 250 may include information provided during platform boot-up and/or information provided during runtime operation of the platform.

In an embodiment, configuration data 250 includes some or all of the types of information in the configuration space of a conventional PCIe device. For example, such information may include PCIe Type 0 header information and, in an embodiment, may further include one or more types of capability information supported by PCI and/or PCIe. By way of illustration and not limitation, a data structure of configuration data 250 may include PCI Power Management Capability registers, Message Signaled Interrupt (MSI) Capability registers and/or any of a variety of additional or alternative registers for storing capability data or other function context information.

I/O device 200 may further comprise a coherency engine 240 including any of a variety of combinations of hardware, firmware and/or executing software to maintain some or all information in configuration data 250 to facilitate function access by a software process. For example, coherency engine 240 may include an application specific integrated circuit (ASIC), a state machine, a microcontroller, microprocessor, processor and/or any of a variety of other circuit logic, according to different embodiments. Maintaining configuration data 250 may include coherency engine 240 exchanging communications with a FuncText data structure in main memory. For example, coherency engine 240 may perform a synchronization process to update configuration data 250 with data which the software process has written to the FuncText data structure. Alternatively or in addition, the synchronization process may update the FuncText data structure with data from configuration data 250—e.g. including data which is to be subsequently read from the FuncText data structure by the software process. Such synchronization may provide coherency between a FuncText data structure in main memory and configuration data 250—e.g. where at a point in time they store respective information which is equivalent, consistent or otherwise coherent.

Figure 3:
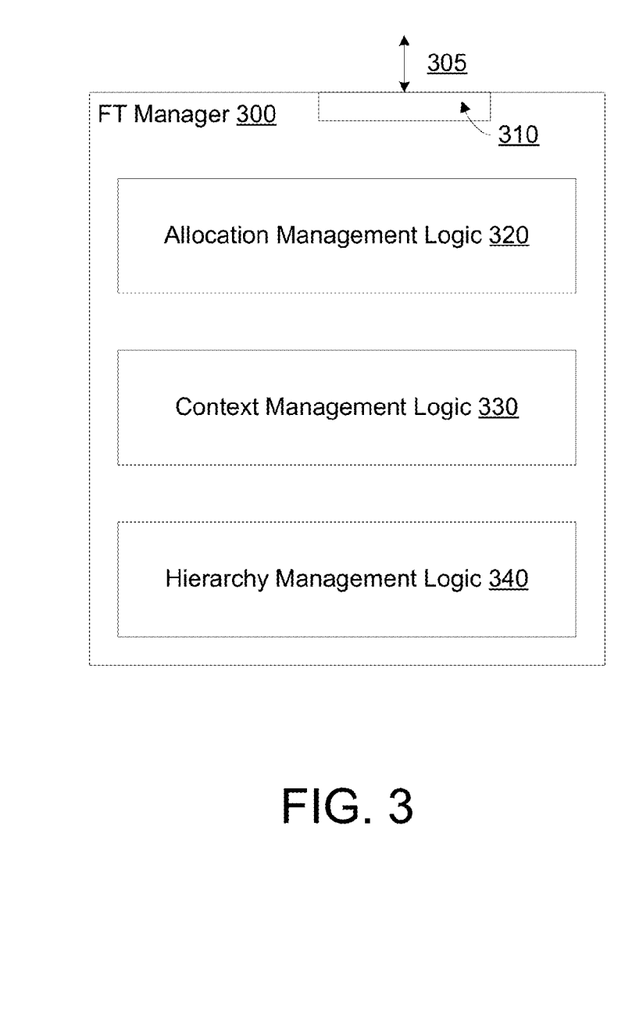
FIG. 3 is a block diagram illustrating elements of logic to manage access to an input/output function according to an embodiment.

FIG. 3 illustrates elements of a FuncText manager 300 according to an embodiment for managing the provisioning of I/O function access to a software process. In an embodiment, FT manager 300 is to facilitate communications between a software process and a device—e.g. including some or all of the features of I/O device 200—which is to implement a function to be accessed by the software process. For example, FT manager 300 may include some or all of the features of FT manager 150.

FT manager 300 may include one or more interfaces, represented by an illustrative interface 310, for coupling FT manager 300 with main memory of the computer platform and/or with one or more I/O devices each via one or more respective point-to-point interconnects. Alternatively, FT manager 300 may be incorporated into an apparatus which includes such one or more interface. In an embodiment, FT manager 300 is to exchange via interface 310 communications 305 compatible with a communication standard such as PCI or PCIe.

Communications 305 may variously provide for management of how an I/O function is to be accessed. For example, allocation management logic 320 of FT manager 300 may include circuitry to issue commands for variously creating or otherwise configuring one or more data structures in main memory and/or in an I/O device which is to perform a function. Alternatively or in addition, allocation management logic 320 may issue communications to associate a FuncText instance with I/O device hardware which is to perform a function of that FuncText instance. By way of illustration and not limitation, allocation management logic 320 may store in the FuncText data structure for a particular FuncText instance a reference to an I/O device which is to perform the function.

In an embodiment, allocation management logic 320 may provide the I/O device and/or a software process with a reference to the FuncText data structure—e.g. for subsequent use in synchronizing or otherwise accessing the FuncText data structure. Allocation management logic 320 may also explicitly identify the I/O device to a software process which is to access the function, although certain embodiments are not limited in this regard. Allocation management logic 320 may further set up one or more mechanisms for an I/O device to be notified of a change to an FT data structure, where synchronization with the configuration data of the I/O device may be based on such notification. For example, allocation management logic 320 may directly or indirectly configure one or more doorbell registers, lightweight notification (LN) channels—such as that according to the LN protocol of PCI-SIG—and/or any of a variety of other means for notifying an I/O device of updates to an FT data structure. In an embodiment, allocation management logic 320 may variously update, delete and/or modify one or more FuncText data structures, FuncText data structures, I/O device references, notification mechanisms and/or the like during runtime operation of the computer platform.

In an embodiment, FT manager 300 further comprises logic to identify which particular function and which particular context(s) are to be associated with one another by a FuncText instance. For example, context management logic 330 of FT manager 300 may detect the availability of a function in one or more I/O devices of the computer platform—e.g. based on conventional device/function discovery mechanisms of PCI and/or PCIe. Context management logic 330 may further detect that some or all of such one or more I/O devices support FT-based mechanisms for providing access to the function.

In an embodiment, context management logic 330 may receive—e.g. from a particular I/O device which is to provide the function—information identifying one or more contexts which are required at least in the case of that particular I/O device. Alternatively or in addition, context management logic 330 may receive from the host OS or other source information identifying one or more contexts which are required at least with respect to the software process which is to access the function. In an embodiment, information provided to context management logic 330 may identify one or more contexts which are based on other constraints imposed by the computer platform. By way of illustration and not limitation, such constraints may include any of a variety of quality of service requirements and/or resource allocation constraints for communication bandwidth, processing cycles, storage capacity and/or any of a variety of other limited resources of the platform. In certain embodiments, some or all contexts to be associated with a function are provided as a priori information to context management logic 330—e.g. from the host OS, dedicated resource management and/or QoS enforcement hardware mechanisms, etc. Context management logic 330 may change information in a FuncText data structure and/or an I/O device data structure to variously update, delete and/or modify the association of a function with context during runtime operation of the computer platform.

Data structures and circuit logic for implementing a FT-based function access may include mechanisms for managing hierarchical relationship between multiple FuncText instances. For example, as discussed herein, a first FuncText data structure may store information indicating whether some other FuncText data structure is, with respect to that first FuncText data structure, a child FuncText data structure or a parent FuncText data structure. In such an embodiment, FT manager 300 may further include hierarchy management logic 340 to perform runtime operations for creating, deleting, modifying or otherwise managing such hierarchical relationships. In certain other embodiments, FT manager 300 does not provide such support for hierarchical FuncText relationships. One or more hierarchical relationships may be specified to hierarchy management logic 340 as a priori information from the OS of other agent. In an embodiment, hierarchy management logic 340 may change information in one or more FuncText data structures variously update, delete and/or modify hierarchical relationships between FuncText data structures during runtime operation of the computer platform.

Figure 4A:
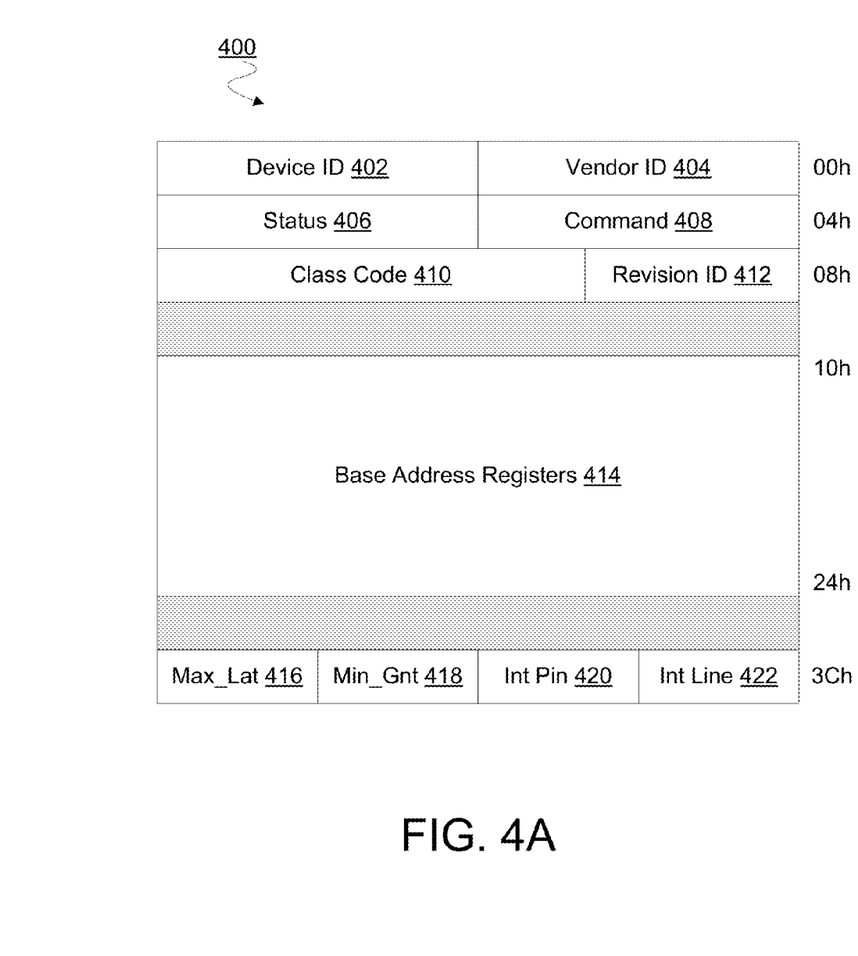
FIG. 4A is a block diagram illustrating elements of configuration data of a input/output device according to an embodiment.

FIG. 4A illustrates elements of configuration data 400 stored in a data repository of an I/O device according to an embodiment. Configuration data 400 may be stored in an I/O device having one or more FuncText capabilities of I/O device 120 for example. In an embodiment, configuration data 400 stores some or all of the information in configuration data 250.

Configuration data 400 may include a data structure which compatible with—and in an embodiment, may serve as—a PCI type 0 configuration space header. For example, configuration data 400 may include a device identifier (ID) register 402 to store an identifier of the device model, a vendor ID register 404 to store an identifier assigned to the vendor of the device, a status register 406 to store an indication of whether certain errors have occurred, and a command register 408 to store a bitmask representing features which are variously enabled/disabled. Configuration data 400 may further store a class code register 410 to store a functional classification of the device, a revision ID 412 to store a revision identifier for the device and various base address registers 414 to store memory addresses, address offsets, etc. used by the device. In an embodiment, configuration data 400 further stores a register Max_Lat 416 to store an indication of how often the device needs access to a PCI/PCIe interconnect, a register Min_Gnt 418 to specify a burst period length required by the device, a register Int Pin 420 to specify an interrupt pin which the device is to use, and a register Int Line 422 to specify an input line to which the device's interrupt pin is connected. The contents and arrangement of information in configuration data 400 is merely illustrative of one implementation, and may not be limiting on certain embodiments.

Figure 4B:
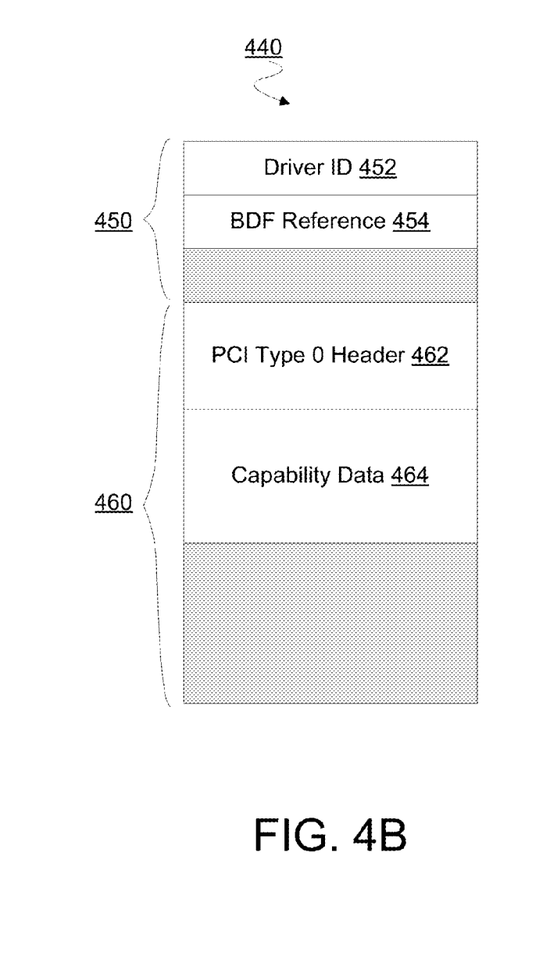
FIG. 4B is a block diagram illustrating elements of a data structure for associating an input/output function with one or more contexts according to an embodiment.

FIG. 4B illustrates elements of a FT data structure 440 according to an embodiment, the FT data structure 440 stored in a main memory to serve as a register level interface for an I/O device and a software process which is to access a function provided by the I/O device. In an embodiment, FT data structure 440 provides a hardware interface for a software process to access information such as that of configuration data 250. For example, FT data structure 440 may include some or all of the features of FT data structure 144.

In an embodiment, 440 includes a main body 460 to store information identifying or otherwise indicating context of the FuncText instance for association with a function of the FuncText instance. By way of illustration and not limitation, main body 460 may include a PCI type 0 header 462 which, for example, includes some or all of the features of configuration data 400. In an embodiment, PCI type 0 header 462 corresponds to a PCI type 0 header of an I/O device which is, at a given time, is to implement the function. Providing a software process with access to the function may include such an I/O device accessing main memory to synchronize PCI type 0 header 462 and its local PCI type 0 header with one another. Main body 460 may include one or more additional registers to store capability data 464, although certain embodiments are not limited in this regard. For example, main body 460 may further include one or more of PCI Power Management Capability registers, Message Signaled Interrupt (MSI) Capability registers, PCIe capability registers and/or any of a variety of additional or alternative registers to store capability data. A version of such capability information may further be stored locally in an I/O device—e.g. as configuration data 400 to be variously synchronized with FT data structure 440.

FT data structure 440 may further comprise a FT header 450 for recognition and/or use of FT data structure 440 to provide access to an I/O function. For example, information in FT header 450 may facilitate use of FT data structure 440 as a register level interface between a software process and FT-specific hardware of an I/O device. FT header 450 may include a field—represented by an illustrative driver ID field 452—to store an indication of a software process which may access a function using the FuncText instance represented by FT data structure 440. In an embodiment, such a software process may be a driver process for driving hardware resources of an I/O device. Information in driver ID field 452 may include or otherwise be based on a vendor ID and/or device ID, for cases where a vendor-supplied device driver is to be used. Alternatively, such information may include or otherwise be based on PCI-SIG (Peripheral Component Interconnect Special Interest Group) definitions for class code, sub-class and/or programming interface information, for cases where a generic OS driver is to be used.

FT header 450 may include another field, represented by an illustrative BDF reference field 454, to store any reference to an I/O device which is to perform the function of the FuncText instance. Information in BDF reference field 454 may include a pointer to the I/O device hardware for a particular Bus, Device, Function triplet. As discussed herein, BDF reference field 454 may be configured to store NULL pointer information—e.g. in embodiments where FT data structure 440 is one of a hierarchy of FuncText data structures.

Figure 5:
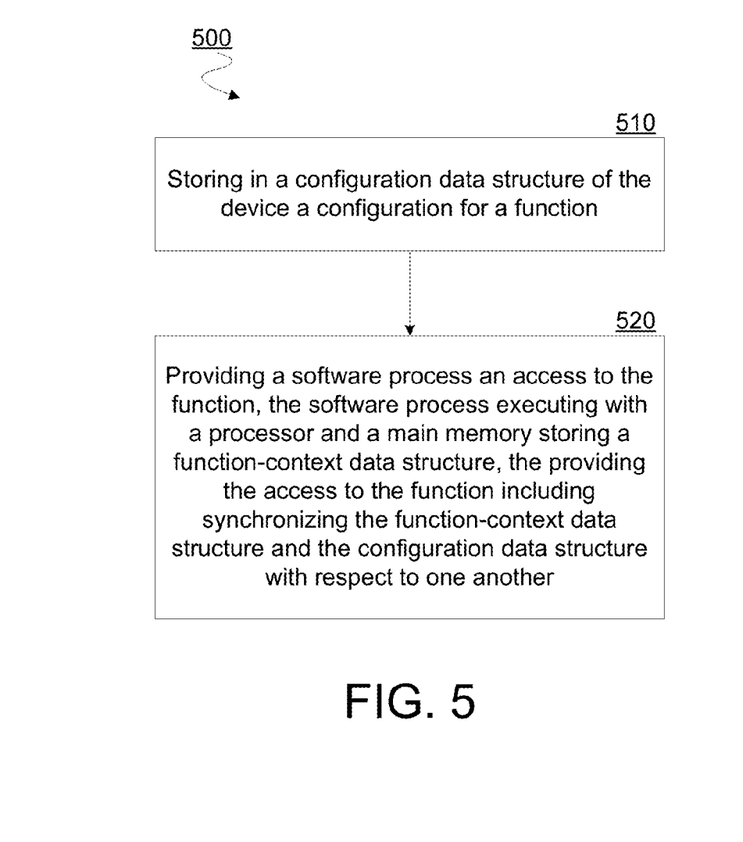
FIG. 5 is a flow diagram illustrating elements of a method for providing access to an input/output function according to an embodiment.

FIG. 5 illustrates elements of a method 500 for an I/O device to provide access to a function according to an embodiment. Method 500 may be performed by a device including some or all of the features of I/O device 200, for example.

Method 500 may include, at 510, storing in a configuration data structure of the I/O device a configuration for a function. The configuration stored at 510 may be, include or otherwise indicate a context according to which the I/O device is to provide access to the function. The configuration may include, for example, configuration space information of a type found in a PCI type 0 header. Alternatively or in addition, the configuration information may include power management capability register information, MSI register information and/or any of a variety of other types of configurations, according to different embodiments.

In an embodiment, method 500 further comprises, at 520, providing a software process with an access to the function. The software process may be a driver for the I/O device, although certain embodiments are not limited in this regard. The software process may execute with a processor and a main memory coupled to the I/O device, the main memory storing a function-context data structure. The providing the access to the function at 520 may include synchronizing the function-context data structure and the configuration data structure with respect to one another. For example, the I/O device may receive during runtime execution of the computer platform a reference (e.g. a pointer, base address, handle, etc.) to a FuncText data structure, wherein the synchronizing is based on the received reference to the FuncText data structure. The I/O device may access the FuncText data structure in response to a lightweight notification communication or, alternatively, in response to an access to a doorbell register corresponding to the FuncText data structure. In an embodiment, the main memory stores a hierarchy of FuncText data structure including the FuncText data structure and a second FuncText data structure wherein the software process accesses the FuncText data structure based on information in the FuncText second data structure.

In an embodiment, the software process is to exchange information with the function-context data structure for the access to the function, wherein the function-context data structure operates as a register level interface which interfaces the I/O device and the software process with one another. For example, access to the function by the software process may include an exchange between the software process and the FuncText data structure which is executed independent of any other software process which might be executing with the host OS.

Figure 6:
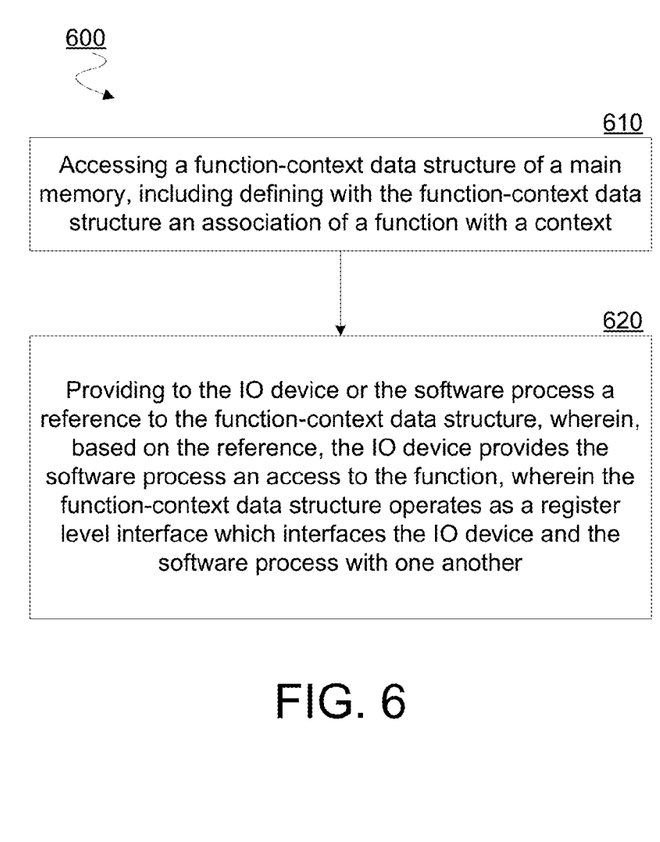
FIG. 6 is a flow diagram illustrating elements of a method for managing access to an input/output function according to an embodiment.

FIG. 6 illustrates elements of a method 600 for a device to manage access to a function according to an embodiment. Method 600 may be performed by a device including some or all of the features of FT manager 300, for example.

Method 600 may include, at 610, accessing a function-context data structure of a main memory coupled to the device, including defining with the function-context data structure an association of a function with a context. The device performing method 600 may be further coupled to an I/O device. A software process may execute with the main memory and a host processor coupled to the device.

In an embodiment, method 600 further comprises, at 620, providing to the I/O device or the software process a reference to the function-context data structure, wherein, based on the reference, the I/O device provides the software process an access to the function, the access according to the context. The software process may exchange information with the function-context data structure for the access to the function, wherein the function-context data structure operates as a register level interface which interfaces the I/O device and the software process with one another.

During runtime operation of the computer platform, the device performing method 600 may further write to the FuncText data structure a reference to an I/O device. Such writing may change an FuncText instance from being associated with a first I/O device for providing access to the function to being associated with a second I/O device for providing access to the function. Alternatively or in addition, the device performing method 600 may, during runtime operation of the computer platform, access the FuncText data structure to change the FuncText data structure from defining an association of a first context with the function to defining an association of a second context with the function. In an embodiment, the device may access the FuncText data structure to define a hierarchy of FuncText data structures in the main memory, the hierarchy of FuncText data structures including the FuncText data structure.

Figure 7:
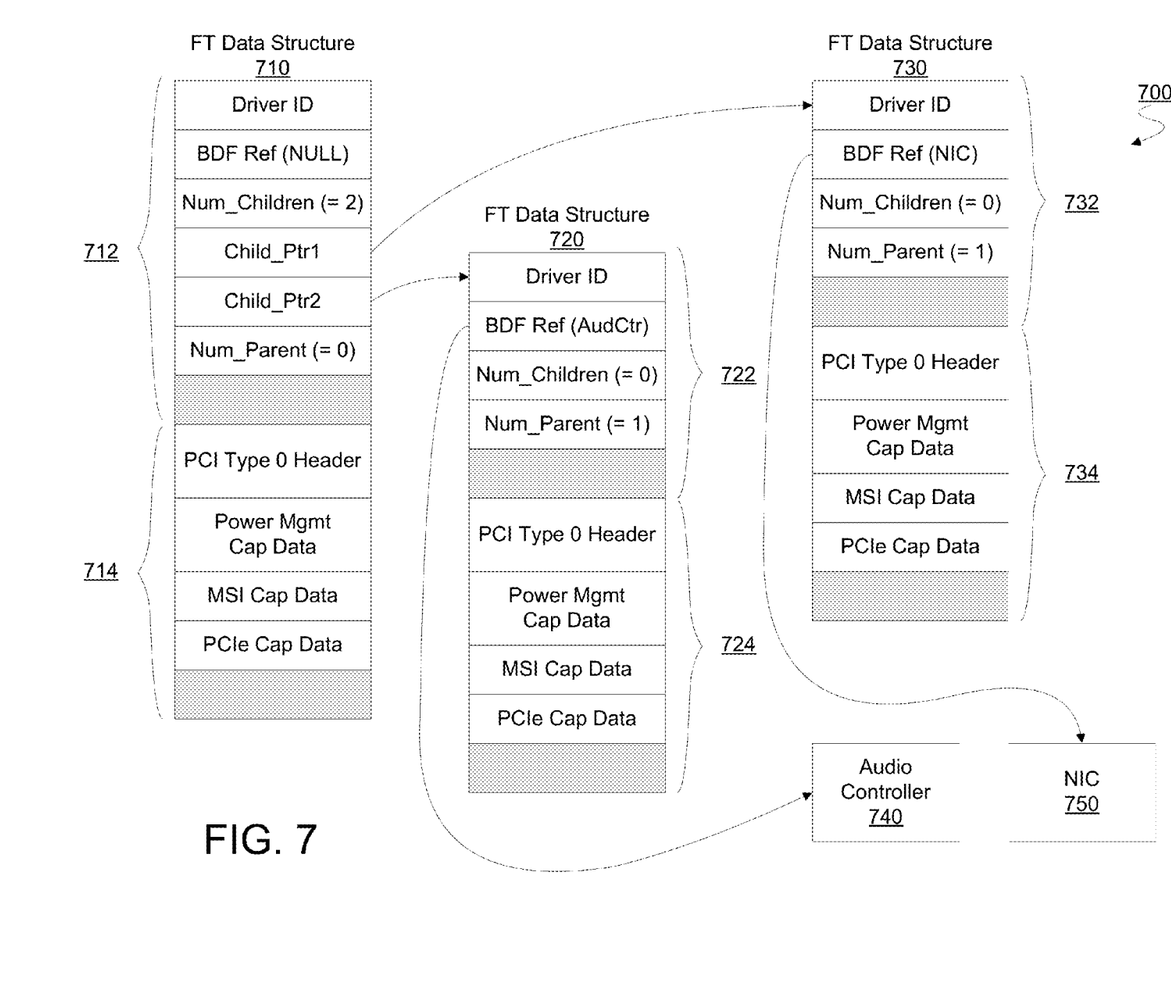
FIG. 7 is a block diagram illustrating elements of hierarchical data structure for providing access to an input/output function according to an embodiment.

FIG. 7 illustrates elements of a hierarchy 700 of FuncText data structures in main memory for providing access to I/O functions according to an embodiment. Hierarchy 700 may be stored in main memory 140, for example, to provide one or more register level interfaces each for a software process to access a respective I/O function.

FT data structures of hierarchy 700 may be variously modified by FuncText management logic during runtime operation of a computer platform—e.g. to change an association of an FuncText instance to an I/O device, to change an association of a function and a context with one another, to change a hierarchical relationship between FuncText data structures and/or the like. In an illustrative scenario according to one embodiment, hierarchy 700 includes FT data structures 710, 720, 730 for various respective FuncText instances. As shown, FT data structures 720, 730 are children of FT data structure 710. In an embodiment, FT data structures 710, 720 and 730 include respective FT headers 712, 722, 732 which, for example, may variously include one or more features of FT header 450. By way of illustration and not limitation, FT headers 712, 722, 732 may each store respective driver identifier information and any reference—e.g. including a BDF pointer—to a respective device which is to implement a function.

Alternatively or in addition, FT data structures 710, 720 and 730 may each include respective main bodies 714, 724, 734 which, for example, variously include one or more features of main body 460. As shown in FIG. 7, main bodies 714, 724, 734 of FT data structures 710, 720 and 730 may variously store PCI type 0 header information, power management capability information, MSI capability information, PCIe capability information or any of a variety of additional or alternative types of data describing a desired or actual configuration of I/O hardware.

FT circuit logic of an I/O device and/or of a FuncText manager may access hierarchy 700 to dynamically allocate I/O resources. By way of illustration and not limitation, a user may launch an application to audio content from some remote source such as the Internet. The application in turn may request that the host OS allocate I/O resources to decode and present the streamed data.

In response to such a request, the host OS and an audio driver/subsystem may establish in main memory FT data structure 710 for a FuncText to play such audio content. FT data structure 710 may, in and of itself, be only indirectly associated with I/O hardware by virtue of other FuncText data structures of hierarchy 700. For example, FT header 712 may include in a BDF reference field which stores a null pointer, indicating that FT data structure 710 represents a logical grouping of hardware resources identified in other FT data structures of hierarchy 700.

In an embodiment, FT data structures 720, 730 may also be established in main memory for two subordinate FuncTexts. Each of FT headers 712, 722, 732 may identify a respective number of child FuncText data structures and/or a respective number of parent FuncText data structures. Alternatively or in addition, FT header 712 may include pointers to its respective child FT data structures 720, 730. In another embodiment, FT headers 722, 732 may variously include pointers (not shown) back to the respective parent FT data structure 710.

FT data structure 720 may, for example, provide software with access to a hardware audio controller 740 for speakers integrated into the computer platform. Moreover, FuncText data structure 730 may provide software with access to a NIC 750 which is to stream back channel audio to speakers which are connected through the user's home network. Upon the termination of the application by the user, some or all of FuncTexts 710, 720, 730 may be de-allocated during runtime, and their respective hardware resources freed.

Figure 8:
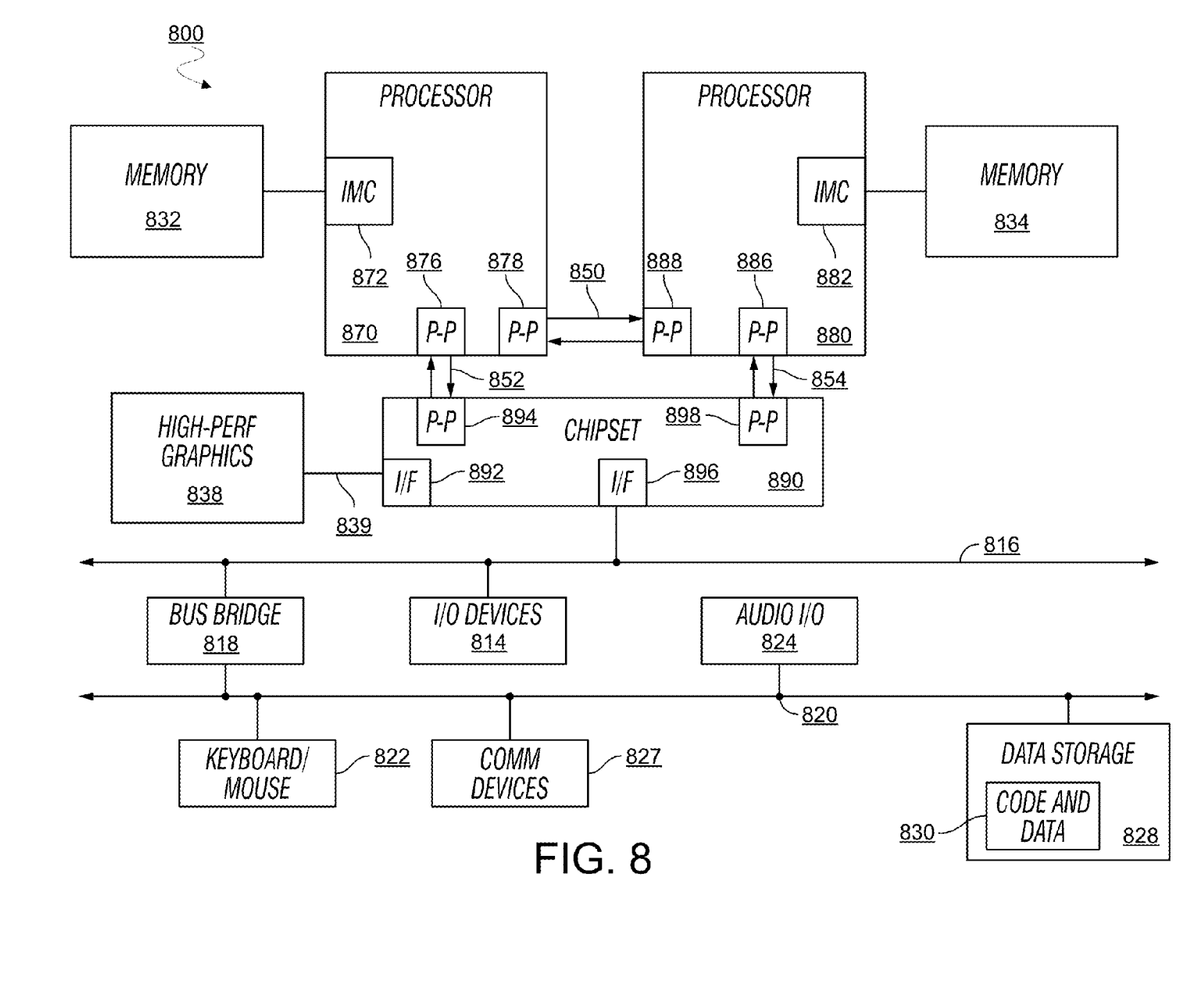
FIG. 8 is a block diagram illustrating elements of a computer platform to perform input/output operations according to an embodiment.

Referring now to FIG. 8, shown is a block diagram of a system 800 in accordance with an embodiment. As shown in FIG. 8, multiprocessor system 800 is a point-to-point (P-P) interconnect system, and includes a first processor 870 and a second processor 880 coupled via a P-P interconnect 850. Each of processors 870 and 880 may be some version of a processor. While shown with two processors 870, 880, it is to be understood that the scope of the present invention is not so limited. In other embodiments, any of a variety of one or more additional or alternative processors may be present in system 800.

Processors 870 and 880 are shown including integrated memory controller units 872 and 882, respectively. Processor 870 may also include as part of its bus controller units P-P interfaces 876 and 878; similarly, second processor 880 includes P-P interfaces 886 and 888. Processors 870, 880 may exchange information via a P-P interface 850 using P-P interface circuits 878, 888. As shown in FIG. 8, IMCs 872 and 882 couple the processors to respective memories, namely a memory 832 and a memory 834, which may be portions of main memory locally attached to the respective processors. In an embodiment, one or both of memories 832, 834 store one or more FuncText data structures for providing software with access to I/O functionality.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via an interface circuit 892 along a high-performance graphics interconnect 839. Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present invention is not so limited.

As shown in FIG. 8, various I/O devices 814 may be coupled to first bus 816, and/or a bus bridge 818 may couple first bus 816 to a second bus 820. One or more such I/O devices 814 may variously store configuration data and include function access circuitry for software to access a function via a FuncText data structure in main memory. In one embodiment, second bus 820 includes a low pin count (LPC) bus. Any of various devices may be coupled to second bus 820 including, for example, a keyboard and/or mouse 822, communication devices 827 and a storage unit 828 such as a disk drive or other mass storage device which often includes instructions/code and data 830, in one embodiment. Further, an audio I/O 824 is shown coupled to second bus 820. Note that other architectures are possible, where the included components and interconnect architectures vary. For example, instead of the point-to-point architecture of FIG. 8, a system may implement a multi-drop bus or other such architecture.

System 800 may include a device comprising an integrated circuit and a hardware interface for that integrated circuit. By way of illustration and not limitation, such device may include processor 870, processor 880, a package (not shown) of chipset 890, memory 832, memory 834 and/or any of various other components of system 800.

Techniques and architectures for accessing functionality of an I/O device are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An input/output (I/O) device comprising:
    a memory to store a configuration data structure including a configuration for a function; and
    a coherency engine including circuitry to provide a software process an access to the function, including the coherency engine to perform a synchronization of a function-context data structure and the configuration data structure with respect to one another, wherein the function-context data structure operates as a register level interface which interfaces the I/O device and the software process with one another.

2. The I/O device of claim 1, the coherency engine further to receive during runtime execution of a computer platform a reference to the function-context data structure, wherein the coherency engine to perform the synchronization based on the function-context data structure.

3. The I/O device of claim 1, wherein the software process is a driver for the I/O device.

4. The I/O device of claim 1, wherein an exchange between the software process and the function-context data structure is performed independent of any other software process executing with the host OS, the exchange between the software process and the function-context data structure for the software process to access the function.

5. The I/O device of claim 1, wherein the I/O device accesses the function-context data structure in response to a lightweight notification communication.

6. The I/O device of claim 1, wherein the I/O device accesses the function-context data structure in response to an access to a doorbell register corresponding to the function-context data structure.

7. The I/O device of claim 1, wherein a hierarchy of function-context data structures includes the function-context data structure and a second function-context data structure wherein the software process accesses the function-context data structure based on information in the function-context second data structure.

8. A method at an input/output (I/O) device, the method comprising:
    storing in a configuration data structure of the I/O device a configuration for a function; and
    providing a software process an access to the function, the software process executing with a processor and a main memory coupled to the I/O device, the main memory storing a function-context data structure, the providing the access to the function including synchronizing the function-context data structure and the configuration data structure with respect to one another, wherein the software process to exchange information with the function-context data structure for the access to the function, wherein the function-context data structure operates as a register level interface which interfaces the I/O device and the software process with one another.

9. The method of claim 8, further comprising receiving during runtime execution of a computer platform a reference to the function-context data structure, wherein the synchronizing is based on the received reference to the function-context data structure.

10. The method of claim 8, wherein the software process is a driver for the I/O device.

11. The method of claim 8, wherein an exchange between the software process and the function-context data structure is performed independent of any other software process executing with the host OS, the exchange between the software process and the function-context data structure for the software process to access the function.

12. The method of claim 8, wherein the I/O device accesses the function-context data structure in response to a lightweight notification communication.

13. The method of claim 8, wherein the I/O device accesses the function-context data structure in response to an access to a doorbell register corresponding to the function-context data structure.

14. The method of claim 8, wherein the main memory stores a hierarchy of function-context data structures including the function-context data structure and a second function-context data structure wherein the software process accesses the function-context data structure based on information in the function-context second data structure.

15. A device comprising:
    one or more interfaces to couple the function-context manger to a host processor, a main memory and an input/output (I/O) device, the host processor and the main memory for execution of a software process;

context management logic including circuitry to access via the one or more interfaces a function-context data structure of the main memory, wherein the context management logic to define with the function-context data structure an association of a function with a context; and allocation management logic including circuitry to provide to the I/O device or the software process a reference to the function-context data structure, wherein, based on the reference, the I/O device provides the software process an access to the function, the access according to the context, wherein the software process exchanges information with the function-context data structure for the access to the function, wherein the function-context data structure operates as a register level interface which interfaces the I/O device and the software process with one another.

16. The device of claim 15, wherein, during runtime operation of a computer platform, the allocation management logic further to write to the function-context data structure a reference to an I/O device, wherein the allocation management logic changes the function-context instance from being associated with a first I/O device for providing access to the function to being associated with a second I/O device for providing access to the function.

17. The device of claim 15, wherein, during runtime operation of a computer platform, the allocation management logic to access the function-context data structure to change the function-context data structure from defining an association of a first context with the function to defining an association of a second context with the function.

18. The device of claim 15, wherein an exchange between the software process and the function-context data structure is performed independent of any other software process executing with the host OS, the exchange between the software process and the function-context data structure for the software process to access the function.

19. The device of claim 15, wherein the I/O device performs a synchronization of the function-context data structure and configuration data structure of the I/O device with respect to one another.

20. The device of claim 15, further comprising hierarchy management logic to access the function-context data structure to define a hierarchy of function-context data structures in the main memory, the hierarchy of function-context data structures including the function-context data structure.

21. A method at a device, the method comprising:

accessing a function-context data structure of a main memory coupled to the device, including defining with the function-context data structure an association of a function with a context, wherein a software process executes with the main memory and a host processor coupled to the device, wherein the device is further coupled to an input/output (I/O) device;

providing to the I/O device or the software process a reference to the function-context data structure, wherein, based on the reference, the I/O device provides the software process an access to the function, the access according to the context, wherein the software process exchanges information with the function-context data structure for the access to the function, wherein the function-context data structure operates as a register level interface which interfaces the I/O device and the software process with one another.

22. The method of claim 21, further comprising:

during runtime operation of a computer platform, writing to the function-context data structure a reference to an I/O device, including changing the function-context instance from being associated with a first I/O device for providing access to the function to being associated with a second I/O device for providing access to the function.

23. The method of claim 21, further comprising:

during runtime operation of a computer platform, accessing the function-context data structure to change the function-context data structure from defining an association of a first context with the function to defining an association of a second context with the function.

24. The method of claim 21, wherein an exchange between the software process and the function-context data structure is performed independent of any other software process executing with the host OS, the exchange between the software process and the function-context data structure for the software process to access the function.

25. The method of claim 21, wherein the I/O device performs a synchronization of the function-context data structure and configuration data structure of the I/O device with respect to one another.

26. The method of claim 21, accessing the function-context data structure to define a hierarchy of function-context data structures in the main memory, the hierarchy of function-context data structures including the function-context data structure.

27. A non-transitory computer-readable storage medium having stored thereon instructions which, when executed by one or more processing units, cause an input/output (I/O) device to perform a method comprising:

storing in a configuration data structure of the I/O device a configuration for a function; and providing a software process an access to the function, the software process executing with a processor and a main memory coupled to the I/O device, the main memory storing a function-context data structure, the providing the access to the function including synchronizing the function-context data structure and the configuration data structure with respect to one another, wherein the function-context data structure operates as a register level interface which interfaces the I/O device and the software process with one another.

* * * * *